US008666409B2

United States Patent
Hao et al.

(10) Patent No.: US 8,666,409 B2
(45) Date of Patent: Mar. 4, 2014

(54) REGISTRATION OR UNREGISTRATION METHOD FOR HOME INFORMATION MACHINE AND HOME INFORMATION MACHINE HEREOF

(75) Inventors: Zhiwei Hao, Shenzhen (CN); Yuanyuan Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/520,885

(22) PCT Filed: Jul. 20, 2010

(86) PCT No.: PCT/CN2010/075293
§ 371 (c)(1),
(2), (4) Date: Jul. 6, 2012

(87) PCT Pub. No.: WO2011/134203
PCT Pub. Date: Nov. 3, 2011

(65) Prior Publication Data
US 2013/0029638 A1    Jan. 31, 2013

(30) Foreign Application Priority Data

Apr. 27, 2010   (CN) .......................... 2010 1 0166682

(51) Int. Cl.
*H04W 4/00* (2009.01)
(52) U.S. Cl.
USPC ...................... 455/435.1; 455/550.1; 455/411
(58) Field of Classification Search
USPC .................... 455/435.1, 550.1, 411; 370/328
See application file for complete search history.

(56) References Cited

U.S. PATENT DOCUMENTS

2006/0271696 A1*  11/2006  Chen et al. .................... 709/229
2008/0165751 A1*   7/2008  Soininen et al. ............. 370/338

(Continued)

FOREIGN PATENT DOCUMENTS

| CN | 1522040 A | 8/2004 |
|---|---|---|
| CN | 101325629 A | 12/2008 |

(Continued)

OTHER PUBLICATIONS

International Search Report in international application No. PCT/CN2010/075293, mailed on Feb. 10, 2011.

(Continued)

*Primary Examiner* — Danh Le
(74) *Attorney, Agent, or Firm* — Oppedahl Patent Law Firm LLC (57) ABSTRACT

The disclosure discloses a registration method or an unregistration method for a home information machine and a home information machine thereof, to solve the problem of low security and reliability in the prior art when a Portable Part (PP) machine is registered on the home information machine. The registration method comprises: a Fixed Part (FP) module of the home information machine receives a registration command and first verification information sent by a Mobile Internet Device (MID) module of the home information machine, wherein the first verification information is used to verify verification information input by the PP machine to be registered; the FP module enters a registration state, and receives a registration request and second verification information sent by the PP machine to be registered; the FP module verifies the second verification information by the first verification information, determines whether the registration of the PP machine to be registered is successful according to the verification result, and exits the registration state when determining that the registration of the PP machine to be registered is successful. When the technical solution of the disclosure is used, security and reliability during the registration process of the PP machine can be improved.

26 Claims, 5 Drawing Sheets

(56) References Cited

U.S. PATENT DOCUMENTS

2009/0093249 A1* 4/2009 Zhu et al. ............... 455/433
2010/0004980 A1* 1/2010 Bowen .................... 705/10

FOREIGN PATENT DOCUMENTS

CN 101616487 A 12/2009
CN 101674316 A 3/2010
KR 20090005267 A 1/2009

OTHER PUBLICATIONS

English Translation of the Written Opinion of the International Search Authority in international application No. PCT/CN2010/075293, mailed on Feb. 10, 2011.

* cited by examiner

REGISTRATION OR UNREGISTRATION METHOD FOR HOME INFORMATION MACHINE AND HOME INFORMATION MACHINE HEREOF

TECHNICAL FIELD

The disclosure relates to the field of mobile communications, particularly to a registration method or an unregistration method for a home information machine and a home information machine thereof.

BACKGROUND

With the development of a wired network and wireless network and the popularity of information technologies, demands for intellectualization, digitalization and informatization of family environment increase gradually, people are no longer satisfied by a traditional terminal equipment with simplex function, the terminal equipment with capability of satisfying various demands on family life, various functions and convenient operation are popular with people.

Integrated with mobile phones, gateways, computers, digital photo frames, is multimedia players and Digital Enhanced Cordless Telecommunications (DECT) and the like, with simple and convenient operation, a home information machine can satisfy demands on family life of people sufficiently.

At present, the home information machine comprises a Mobile Internet Device (MID) and a wireless Access Point (AP); the MID is configured to realize functions of mobile phones, computers, digital photo frames and multimedia players; the wireless AP is configured to realize functions of gateways. The terminal equipment such as the MID and computer is connected with the wireless AP through Wi-Fi and accesses the internet through the wireless AP; the mobile phone with DECT functions is connected with the wireless AP through DECT and realizes functions such as making a call and receiving short messages through the wireless AP. Therefore are various DECT functions, including receiving/sending short messages, making calls and accessing internet through the wired or wireless way; at present, the DECT in 1.8G or 1.9G must support Generic Access Profile (GAP), and another DECT supports a Cordless Advanced Technology internet and quality (CAT-iq) protocol. Through above standard protocols, it can be ensured that any terminal equipment with DECT functions can access any DECT fixed phone supporting above standard protocols.

Figure 1:
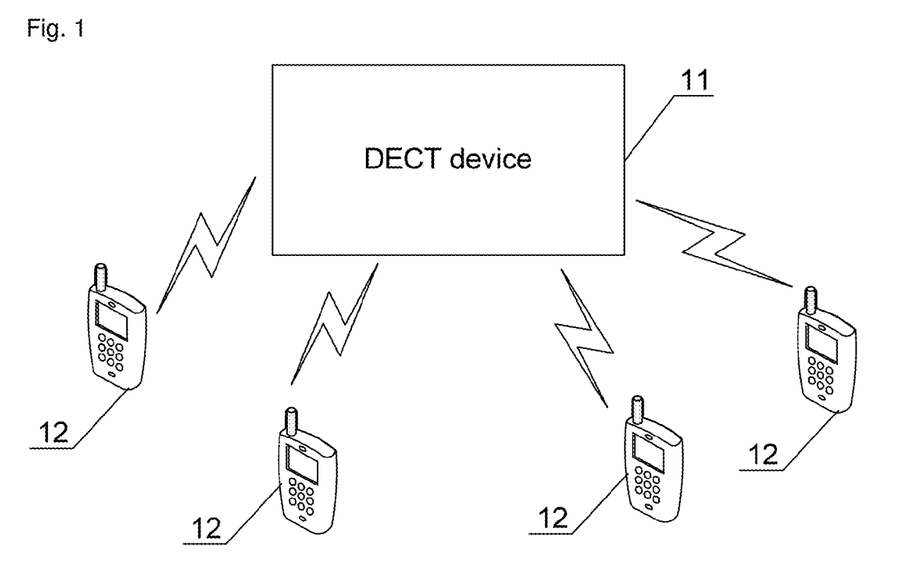
FIG. 1 shows a structure diagram of a DECT fixed phone and DECT sub-machines in a home information machine in the prior art.

A DECT device in the prior art can be accessed with a plurality of DECT sub-machines, FIG. 1 shows a structure diagram of a DECT device 11 accessing a plurality of DECT sub-machines 12 in the prior art, the plurality of DECT sub-machines 12 are connected with the DECT device 11 through wireless way, as limited to the DECT device 11, the management of the DECT device 11 for the DECT sub-machines 12 (for example, registration and unregistration of the DECT sub-machines 12, and the like) is relatively simple. For example, in terms of the registration of the DECT sub-machine, a registration password is stored in the DECT fixed phone of the DECT device, the registration of the DECT sub-machine comprises: the DECT sub-machine searches the DECT fixed phone, and sends a registration request to the DECT fixed phone when searching the DECT fixed phone; the DECT fixed phone sends a registration password input command to the DECT sub-machine initiating the registration request; the DECT sub-machine sends the registration password to the DECT fixed phone; the DECT fixed phone verifies the registration password sent by the DECT sub-machine, and determines that the registration of the DECT sub-machine is successful when the verification is successful. In terms of the unregistration of the DECT sub-machine, the automatic unregistration of the DECT sub-machine can be realized just by clearing registration information of the DECT sub-machine on the DECT sub-machine, it is unnecessary to notify the DECT fixed phone.

The existing registration process is employed, and the registration password is stored in the DECT fixed phone. When the machine is delivered from a factory, an initial password is set as the registration password and stored in the DECT fixed phone; during the use, a user can modify the registration password through the registered DECT sub-machine. The DECT sub-machine can modify the registration password only after successful registration; therefore, an illegal user just needs to obtain the verification information of the home information machine to access illegal PP machines to the home information machine, and further to embezzle resources. Therefore, the use of the existing registration process has the problem of low security and reliability; besides, the registration password has to be managed by the user, the usability of the DECT device is influenced to some extent.

Besides, the existing unregistration method of the DECT sub-machine also may cause some problems when the DECT sub-machine is applied in the home information machine, which is inconvenient for the home information machine to manage the DECT device.

SUMMARY

Therefore, the main purpose of the disclosure is to provide a registration method or an unregistration method for a home information machine and a home information machine thereof, to improve the security and reliability for the registration of digital wireless phone sub-machines.

In order to solve above technical problems, the technical solution of the disclosure is realized as follows.

A registration method for a home information machine comprises:

a Fixed Part (FP) module of the home information machine receives a registration command and first verification information sent by a Mobile Internet Device (MID) module of the home information machine, wherein the first verification information is used to verify verification information input by a Portable Part (PP) machine to be registered;

the FP module enters a registration state, and receives a registration request and second verification information sent by the PP machine to be registered; and the FP module verifies the second verification information by the first verification information, determines whether the registration of the PP machine to be registered is successful according to the verification result, and exits the registration state when determining that the registration of the PP machine to be registered is successful.

The method may further comprise: before the FP module enters the registration state, the FP module judges whether entering of the registration state is allowed according to a current service state of the FP module, sends a notification message indicating that the entering of the registration state is prohibited to the MID module, and ends the registration process when the entering of the registration state is not allowed.

The FP module determining whether the registration of the PP machine to be registered is successful may specifically comprise: the FP module compares the first verification information with the second verification information, determines that the registration is successful when the first verification information and the second verification information are identical, and determines that the registration is not successful when the first verification information and the second verification information are not identical.

The method may further comprise: after determining that the registration of the PP machine to be registered is successful, the FP module sends registration information of the registered PP machine to the MID module; the MID module updates the stored registration information of the registered PP machine using the received registration information.

The first verification information may be verification information randomly generated by the MID module, or verification information self-defined by the user through an interface provided by the MID module.

The method may further comprise: after the FP module enters the registration state, when the FP module fails to receive the registration request sent by the PP machine to be registered within a threshold time period after entering the registration state, the FP module exits the registration state and ends the registration process.

The method may further comprise: after determining that the registration of the PP machine to be registered is failed, the FP module sends a verification information input command to the PP machine to be registered, and verifies a third verification information input by the PP machine to be registered by the first verification information;

when a number of times for inputting the verification information by the PP machine to be registered exceeds a set threshold number and neither of the inputs of the verification information is correct, the FP module exits the registration state and ends the registration process.

An unregistration method for a home information machine comprises:

a Fixed Part (FP) module of the home information machine receives an unregistration request sent by a Mobile Internet Device (MID) module of the home information machine or a Portable Part (PP) machine to be unregistered, wherein the unregistration request includes identification information of the PP machine to be unregistered;

the FP module unregisters the PP machine corresponding to the identification information included in the unregistration request; and the FP module sends a notification message indicating that unregistration is successful to the PP machine to be unregistered.

The method may further comprise: before the FP module unregisters the PP machine, the FP module determines whether unregistration of the PP machine is allowed according to a current service state of the FP module, sends a notification message indicating that the unregistration is not allowed to the MID module or the PP machine initiating the unregistration request, and ends the unregistration process when the unregistration of the PP machine is not allowed.

The method may further comprise: after the FP module unregisters the PP machine successfully, the FP module sends an unregistration message to the MID module; the MID module updates stored registration information of the registered PP machine using the unregistration message.

A home information machine, comprises a Mobile Internet Device (MID) module, and further comprises a Fixed Part (FP) module;

the MID module is configured to send a registration command and first verification information to the FP module;

the FP module is configured to enter a registration state and receive a registration request and second verification information sent by a Portable Part (PP) machine to be registered when receiving the registration command; and to verify the second verification information by the first verification information, determine whether the registration of the PP machine to be registered is successful according to the verification result, and exit the registration state when determining that the registration of the PP machine to be registered is successful.

The FP module may be further configured to judge, before entering the registration state, whether entering of the registration state is allowed according to a current service state of the home information machine, and to send a notification message indicating that the entering of the registration state is prohibited to the MID module and end the registration process when the entering of the registration state is not allowed.

The FP module may be further configured to send registration information of the registered PP machine to the MID module after determining that the registration of the is PP machine to be registered is successful; the MID module may be further configured to update the stored registration information of the registered PP machine using the received registration information.

A home information machine, comprises a Mobile Internet Device (MID) module, and further comprises a Fixed Part (FP) module;

the FP module is configured to receive an unregistration request sent by the MID module of the home information machine or a Portable Part (PP) machine to be unregistered, wherein the unregistration request includes identification information of the PP machine to be unregistered; to unregister the PP machine corresponding to the identification information included in the unregistration request; and to send a notification message indicating that unregistration is successful to the PP machine to be unregistered.

The FP module may be further configured to determine, before unregistering the PP machine, whether unregistration of the PP machine is allowed according to a current service state of the FP module, to send a notification message indicating that the unregistration is not allowed to the MID module or the PP machine initiating the unregistration request, and to end the unregistration process when the unregistration of the PP machine is not allowed.

The FP module may be further configured to send an unregistration message to the MID module after unregistering the PP machine successfully; the MID module may be further configured to update stored registration information of the registered PP machine using the unregistration message.

In the embodiment of the disclosure, when it is necessary to access the PP machine to the home information machine, the PP module of the home information machine receives the registration command ad the first verification information sent by the MID module of the home information machine; the FP module enters the registration state, and receives the registration request and the second verification information sent by the PP machine to be registered; the FP module verifies the second verification information by the first verification information, determines whether the registration of the PP machine to be registered is successful according to the verification result, and exits the registration state when determining that the registration of the PP machine to be registered is successful. With the technical solution of the disclosure, when the PP machine is registered, the registration process can be executed only after the FP module is controlled by the MID module to enter the registration state, when the FP module exits the registration state, the registration process is prohibited, therefore the problem in the prior art of low security and reliability during registration resulted from illegal users accessing illegal PP machines to the home information machine just by obtaining the verification information of the home information machine can be overcome.

DETAILED DESCRIPTION

For the technical problems in the prior art, an embodiment of the disclosure provides a registration method or an unregistration method for a home information machine and a home information machine thereof, to improve the security and reliability during the is registration of sub-machines in the home information machine. The method mainly comprises: a fixed part (FP) module is set in the home information machine, when a DECT sub-machine needs to be registered, a user needs to use an MID module of the home information machine to control the FP module to enter a registration state, and registration operation can be executed only after the FP module enters the registration state; in addition, after the registration of the DECT sub-machine is successful, the FP module is controlled by the MID module to exit the registration sate; once the FP module exits the registration state, the registration operation of DECT sub-machines is not allowed. With the technical solution of the disclosure, when the DECT sub-machine needs to be registered, the registration can be realized through cooperation of the FP module, the MID module and the DECT sub-machine to be registered in the home information machine, therefore the problem in the prior art of low security and reliability resulted from illegal users accessing a non-local DECT sub-machine to the local home information machine by realizing the registration just through participation of the MID module and the DECT sub-machine to be registered can be avoided.

The technical solution of the disclosure will be described in details below with reference to drawings.

Figure 2:
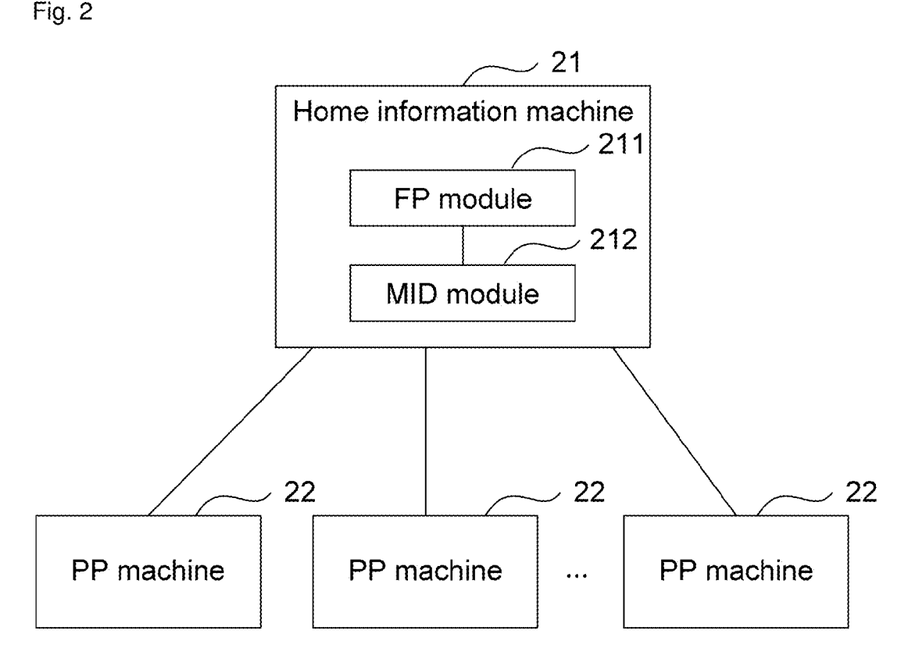
FIG. 2 shows a structure diagram of a home information machine in an embodiment of the disclosure.

FIG. 2 shows a structure diagram of a DECT system in an embodiment of the disclosure, the DECT system comprises a home information machine 21 and a plurality of DECT sub-machines 22, and Portable Part (PP) machine is configured to represent the DECT sub-machine in the following description. A plurality of PP machines 22 are accessed to the home information machine 21, to realize calls, short message receiving/sending and data transmission and the like through the home information machine 21.

The home information machine 21 comprises an FP module 211 and an MID module 212;

the FP module 211 is configured to store registration information of the PP machines 22 already registered in the DECT system, and to realize functions such as registration and unregistration of the PP machines 22.

More specifically, in the flow of realizing the registration of the PP machines, the FP module 211 is configured to, receive a registration command sent by the MID module 212, and enter a registration state; to receive and store a registration password from the MID module 212, wherein the registration password is configured to verify the input password when the PP machine is registered; after receiving a registration request from the PP machine 22 to be registered, and to send a notification message indicating to input the password to the PP machine 22 to be registered, compare the password sent by the PP machine 22 to be registered with the registration password stored locally, and send the registration information of the PP machine 22 to be registered to the MID module 212 after the verification is successful. In the flow of realizing the unregistration of the PP machines, the FP module 211 is configured to, receive an unregistration request sent by the MID module 212 or the PP machines 22 to be unregistered, according to the unregistration request, and to delete the registration information of the PP machines 22 to be unregistered, and send the notification message indicating that the unregistration is successful to the MID module 212.

The MID module 212 is configured to obtain the registration information of the PP machines 22 from the FP module 211, and display the obtained registration information to a user; and to manage the registration and unregistration of the PP machines 22, and set parameter information of the FP module 211; wherein the parameter information comprises phone function related parameters, short message function related parameters, data transmission function related parameters, and related processing parameters of the FP module 211 during the registration and unregistration.

Generally, the MID module 212 is further configured to manage other functions of the FP module 211 and the PP machines 22, including call, short message receiving/sending and data transmission and other services.

More specifically, in the flow of realizing the registration of the PP machines, the MID module 212 is configured to send a registration command to the FP module 211, and send a registration password to the FP module 211; after receiving registration is information of the PP machine 22 to be registered with successful registration from the FP module 211, to update the locally stored registration information of the PP machine 22. In the flow of realizing the unregistration of the PP machines, the MID module 212 is configured to send an unregistration command to the FP module 211, wherein the unregistration command includes identification information of the PP machine 22 to be unregistered; after receiving the unregistration successful notification message about the unregistration of the PP machine 22 to be unregistered from the FP module 211, and to update the locally stored registration information of the PP machine 22.

Figure 3:
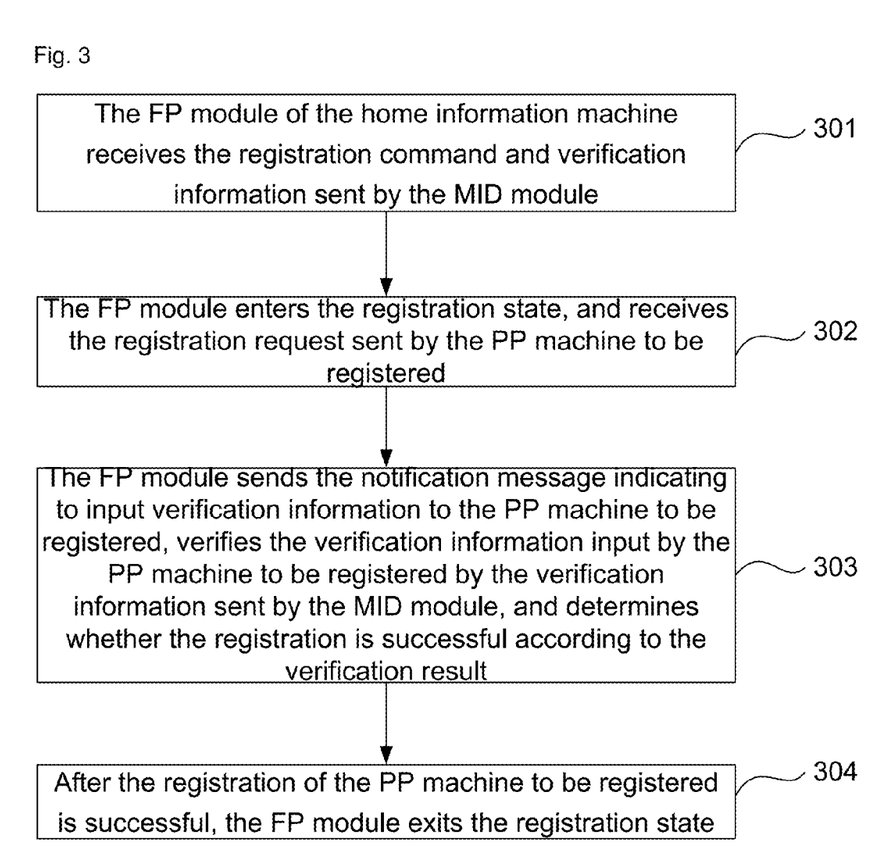
FIG. 3 shows a flowchart of a registration method for DECT sub-machines in an embodiment of the disclosure.

The registration process in the technical solution of the disclosure will be described in details below with reference to the system as shown FIG. 2, and FIG. 3 shows a flowchart of a registration method for PP machines in an embodiment of the disclosure, and the method comprises the following steps.

Step S301: The FP module of the home information machine receives the registration command and verification information for verifying the PP machine to be registered sent by the MID module.

In this step, the verification information may be randomly generated by the MID module at each time of registration process, also may be set by the user according to the interface provided by the MID module (that is, self-defined verification information), and also may be verification information generated through other ways.

Step S302: The FP module enters the registration state, and receives the registration request sent by the PP machine to be registered.

Step S303: The FP module sends the notification message indicating to input verification information to the PP machine to be registered, verifies the verification information input by the PP machine to be registered by the verification information sent by the MID module, and determines whether the registration is successful according to the verification result.

The step that the FP module verifies the verification information input by the PP machine to be registered is specifically as follow: compares the verification information sent by the MID module with the verification information sent by the PP machine to be registered; if they are identical, then determines that the verification is successful; if not, then determines that the verification is failed.

Besides the above verification method, the verification way may be that corresponding relations of a plurality of a first verification information sent to the FP module and a second verification information to be input by the PP machine are set in the MID module in advance, when one registration process occurs, the user sends a randomly selected first verification information to the FP module through the MID module; during the registration procedure, if the verification information input by the PP machine to be registered is identical with the second verification information corresponding to the first verification information in the FP module, then it is indicated that the verification is successful; otherwise, the verification is failed.

Step S304: After the registration of the PP machine to be registered is successful, the FP module exits the registration state.

In this step, the FP module exits the registration state according to the registration exit command sent by the MID module.

Preferably, in order to update the stored registration information of the registered PP machine in the MID module in time, after the registration of the PP machine to be registered is successful, the FP module sends the registration information of the PP machine to be registered to the MID module, thereof the MID module can update the registration information of the registered PP machine in time.

Preferably, in order to reduce influence of the registration process of the PP machine on the home information machine, the flow further comprises the following step between steps S301 and S302: according to the current service state of the FP module itself, the FP module determines whether entering the registration state is allowable; for example, when there are other PP machines executing services such as call, short message receiving/sending, registration, unregistration, data transmission or password modification, the FP module determines that entering the registration state is not allowable; otherwise, the FP module determines that entering the registration state is allowable. If allowable, the FP module sends a notification message indicating that it is allowed to enter the registration state to the MID module; if not allowable, the FP module sends a notification message indicating that it is prohibited to enter the registration state to the MID module, exits the registration state automatically, and reports a notification message indicating that registration process is ended to the MID module.

Preferably, in order to avoid the problem of high registration failure rate caused by incorrect verification information input by the PP machine to be registered due to the input error of the user, in step S303, if verification is failed, the method further comprises the following steps: the FP module sends a notification message indicating to input verification information again to the PP machine to be registered, if the correct verification information is still not input when the number of times for inputting the verification information by the PP machine to be registered exceeds the preset threshold, then the FP module determines that the registration of the PP machine to be registered is failed, thus the FP module exits the registration state automatically and reports the notification message indicating that registration process is ended to the MID module.

Preferably, in order to avoid the serious influence on the home information machine due to relatively long time when the PP machine to be registered initiates the registration request, in the technical solution of the disclosure, a threshold time period is set in advanced, in step S302, if the FP module fails to receive the registration request from the PP machine to be registered within the threshold time period after entering the registration state, when the threshold time period arrives, the FP module exits the registration state automatically and reports the notification message indicating that the registration process is ended to the MID module.

Preferably, in order to determine the security of the registration process of the PP machine, in the technical solution of the disclosure, for each registration process, the MID module generates different verification information, for example through the way of random generation described above, or the way of requiring the user to input verification information through the MID interface during each registration process, and then sends is the verification information generated for this registration process to the FP module, to realize the dynamic change of the verification information and reduce the insecure probability resulted from long-term use of same verification information.

To make those skilled in the art understand the technical solution of the disclosure more clear and detailed, the flows of registration and unregistration of the PP machine will be described in details below with reference to a plurality of flowcharts, respectively.

Figure 4:
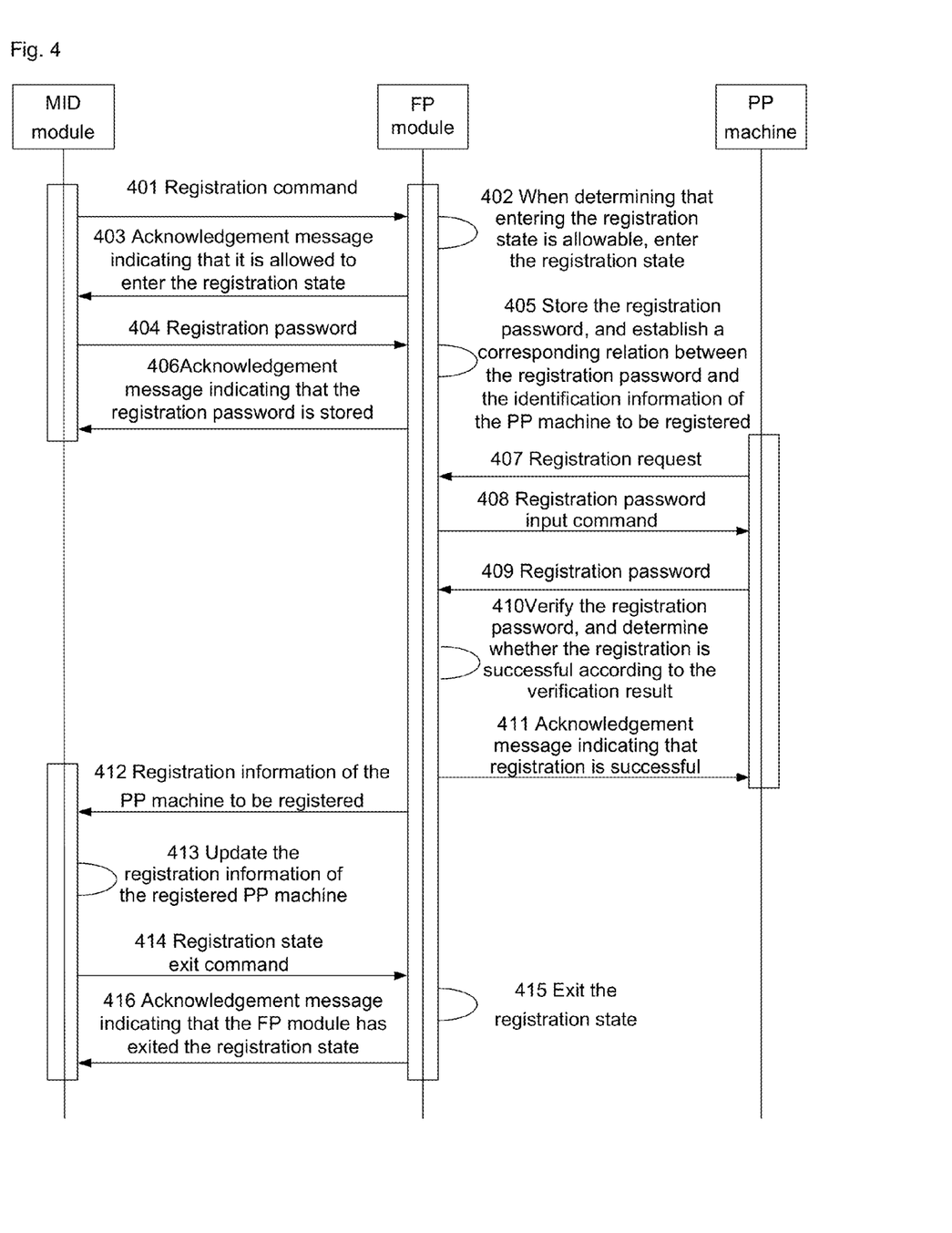
FIG. 4 shows a signaling flowchart of a registration method for DECT sub-machines in an embodiment of the disclosure.

FIG. 4 shows a signaling flowchart of a registration method for a PP machine to be registered in an embodiment of the disclosure; and the method comprises the following steps.

Step S401: When the user needs to access a new PP machine to the home information machine, the MID module of the home information machine is configured to send the registration command to the FP module of the home information machine, and the registration command includes the identification information of the PP machine to be registered.

Steps S402-S403: When receiving the registration command from the MID module and determining that entering the registration state is allowable, the FP module enters the registration state; after entering the registration state, the FP module sends an acknowledgement message indicating that it is allowed to enter the registration state to the MID module.

Steps S404-S406: The MID module sends the registration password (namely, verification information) to the FP module; the FP module stores the received registration password, and establishes a corresponding relation between the registration password and the identification information of the PP machine to be registered; the FP module sends an acknowledgement message indicating that the registration password is stored to the MID module.

Steps S407-S408: The FP module receives the registration request sent by the PP machine to be registered, and sends a registration password input command to the PP machine to be registered.

Step S409: The FP module receives the registration password input by the PP machine to be registered.

Step S410: The FP module verifies the registration password input by the PP machine to be registered by the locally stored registration password corresponding to the PP machine to be registered, and determines whether the registration of the PP machine to be registered is successful according to the verification result.

Steps S411-S412: After determining that the registration is successful, the FP module sends an acknowledgement message indicating that registration is successful to the PP machine to be registered; besides, the FP module reports the registration information of the PP machine to be registered to the MID module.

Step S413: The MID module updates the locally stored registration information of the registered PP machine using the received registration information.

Step S414: The MID module sends a registration state exit command to the FP module.

Steps S415-S416: The FP module exits the registration state according to the received registration state exit command, and reports an acknowledgement message indicating that the FP module has exited the registration state to the MID module.

Figure 5:
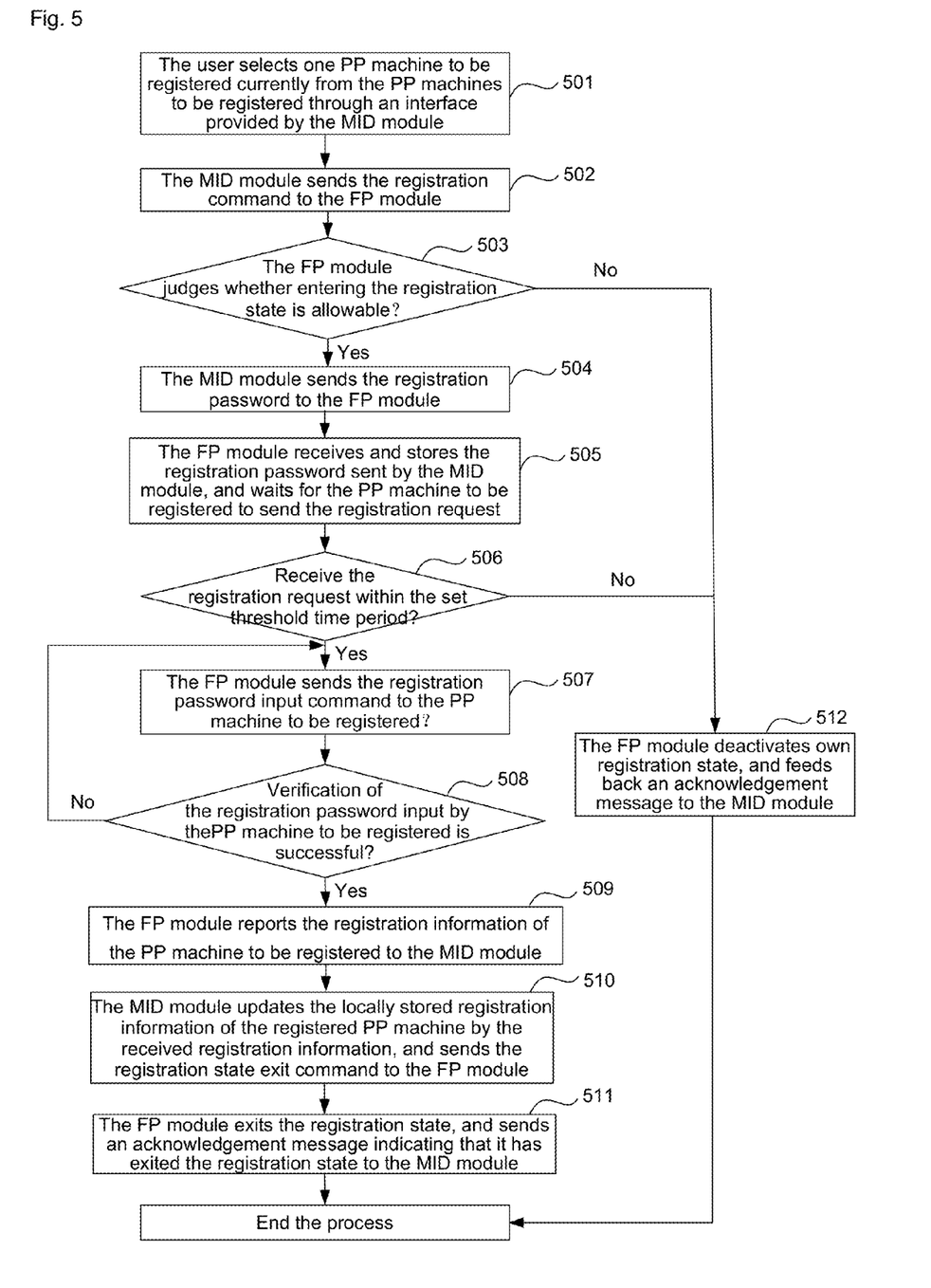
FIG. 5 shows a registration flowchart of a registration method for DECT sub-machines in an embodiment of the disclosure.

The flow of accessing the PP machine to the home information machine will be described below in details with reference to practical application scene; FIG. 5 shows a registration flowchart of a registration method for a PP machine in an embodiment of the disclosure, and the method comprises the following steps.

Step S501: The user selects one PP machine to be registered currently from the PP machines to be registered through an interface provided by the MID module of the home information machine.

Step S502: The MID module sends the registration command to the FP module of the home information machine, the registration command includes the identification information of the PP machine to be registered, such as an ID of the PP machine, a name of the PP machine or other identification information that can uniquely identifies is the PP machine.

Step S503: The FP module judges whether entering the registration state is allowable; if yes, execute step S504; otherwise execute step S512.

In this step, the step that the FP module judges whether entering the registration state is allowable specifically comprises: the FP module judges whether there are other PP machines executing services such as call, short message receiving/sending, registration, unregistration, data transmission or password modification; if yes, the FP module determines that entering the registration state is not allowable; otherwise, the FP module determines that entering the registration state is allowable.

Step S504: The MID module sends the registration password to the FP module; the registration password is configured to verify the password input by the PP machine to be registered.

Step S505: The FP module receives and stores the registration password sent by the MID module, and waits for the PP machine to be registered to send the registration request.

Step S506: The FP modules judges whether the registration request sent by the PP machine to be registered is received within the threshold time period after receiving the registration password; if yes, execute step S507; otherwise, execute step S512.

Step S507: The FP module sends the registration password input command to the PP machine to be registered.

Step S508: The FP module receives the registration password sent by the PP machine to be registered, and verifies the registration password sent by the PP machine to be registered by the registration password sent by the MID module; if the verification is successful, execute step S509; otherwise, directly execute step S512, or return to execute step S507; if the correct registration password is still not input when the number of times of input by the PP machine to be registered exceeds the preset threshold, execute step S512.

Step S509: When determining that the registration of the PP machine to be registered is successful, the FP module reports the registration information of the PP machine to be registered to the MID module, and sends an acknowledgement message indicating that the registration is successful to the PP machine to be registered.

Step S510: The MID module updates the locally stored registration information of the registered PP machine using the received registration information, and sends the registration state exit command to the FP module.

Step S511: The FP module exits the registration state, sends an acknowledgement message indicating that it has exited the registration state to the MID module, and ends the registration process.

Step S512: The FP module exits the registration state actively, sends an acknowledgement message indicating that it has exited the registration state to the MID module, and ends the registration process.

The embodiment of the disclosure also provides a flowchart of an unregistration method for the PP machine. Detailed descriptions will be given below by respectively taking the flow of the MID module initiating unregistration of the PP machine and the flow of the PP machine initiating unregistration actively as examples.

Figure 6:
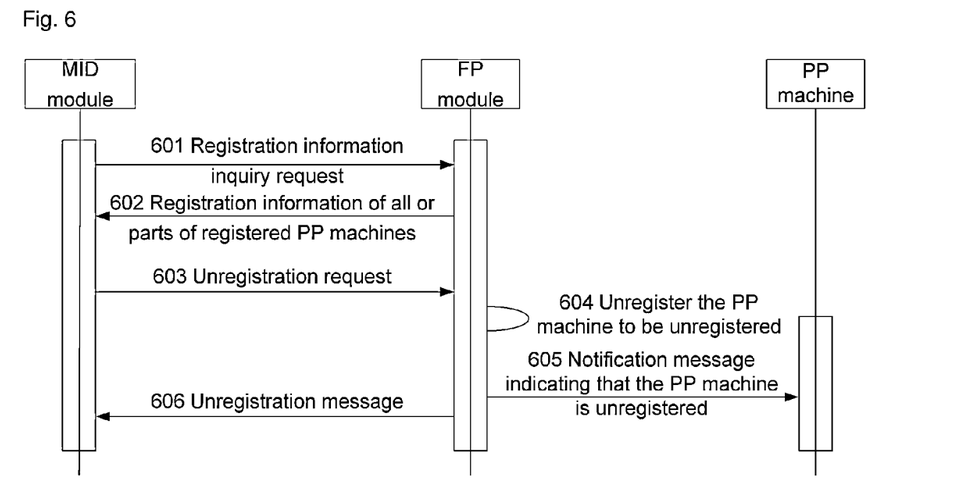
FIG. 6 shows an unregistration flowchart of unregistration of DECT sub-machines initiated by an MID module in an embodiment of the disclosure.

FIG. 6 shows a flowchart of an unregistration method of the PP machine initiated by the MID module in an embodiment of the disclosure; and the method comprises the following steps.

Step S601: The MID module sends a registration information inquiry request to the FP module.

Step S602: The FP module sends the locally stored registration information of all or parts of registered PP machines to the MID module.

In the embodiment of the disclosure, an agreement can be made between the MID module and the FP module, if the registration information inquiry request does not include the identification information of the PP machines, the FP module sends the locally stored registration information of all registered PP machines to the MID module; if the registration information inquiry request includes the identification information of the is PP machines, the FP module sends the registration information of the PP machine corresponding to the identification information in the inquiry request to the MID module.

Step S603: The MID module selects the PP machine as unregistered according to the obtained registration information, that is, the PP machine to be unregistered, and sends the unregistration request to the FP module; wherein the unregistration request includes the identification information of the PP machine to be unregistered.

Steps S604-S605: According to the unregistration request, the FP module unregisters the PP machine to be unregistered, and sends a notification message indicating that the PP machine is unregistered to the PP machine to be unregistered.

Preferably, as the PP machine to be unregistered may be executing certain service currently, in order to avoid influence of the unregistration process on the service of the PP machine to be unregistered, the method further comprises the following step between steps S603 and S604: the FP module judges whether the unregistration of the PP machine to be unregistered is allowable; if yes, execute step S604; otherwise, send a notification message indicating that the unregistration of the PP machine to be unregistered is not allowable to the MID module; the step that the FP module judges whether the unregistration is allowable specifically comprises: if the FP module judges that the PP machine to be unregistered or other PP machines are executing services such as call, short message receiving/sending, data transmission, registration or unregistration, then it determines that the unregistration of the PP machine to be unregistered is not allowable; otherwise, it determines that the unregistration of the PP machine to be unregistered is allowable.

Preferably, in order to update the registration information of the registered PP machines stored in the MID module in time, after step S604, the method further comprises the following step.

Step S606: The FP module sends an unregistration message to the MID module, thereof the MID module can update the locally stored registration information of the registered PP machines using the unregistration message.

Figure 7:
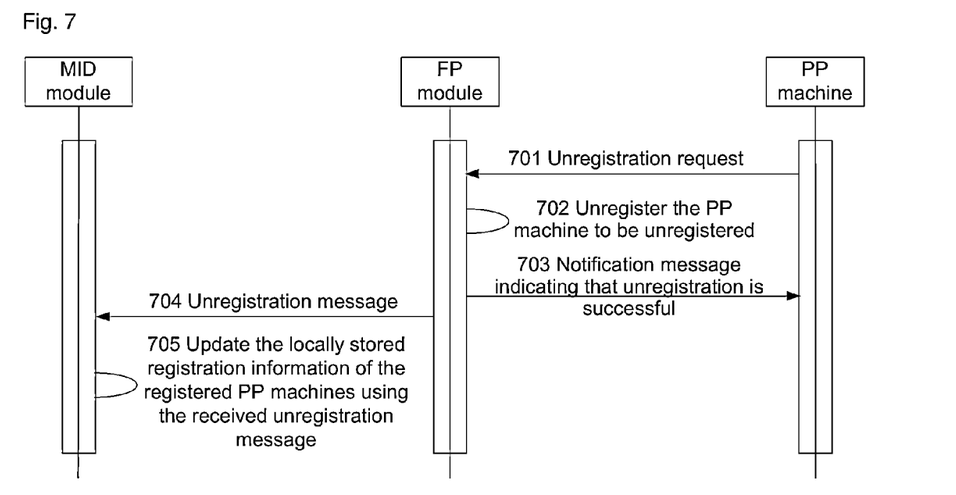
FIG. 7 shows an unregistration flowchart of unregistration initiated by DECT sub-machines in an embodiment of the disclosure.

FIG. 7 shows a flowchart of an unregistration method initiated by the PP machine in an embodiment of the disclosure, and the method comprises the following steps.

Step S701: The PP machine to be unregistered sends an unregistration request to the FP module, wherein the unregistration request includes the identification information of the PP machine to be unregistered.

Step S702: The FP module unregisters the PP machine to be unregistered.

Step S703: The FP module sends a notification message indicating that the unregistration is successful to the PP machine to be unregistered.

Preferably, since the PP machine to be unregistered may be executing certain service currently, in order to avoid influence of the unregistration on the service of the PP machine to be unregistered, the method further comprises the following step between steps S701 and S702: the FP module judges whether the unregistration of the PP machine to be unregistered is allowable; if yes, execute step S702; otherwise, send a notification message indicating that the unregistration of the PP machine to be unregistered is not allowable to the PP machine to be unregistered.

Preferably, in order to update the registration information of the registered PP machines stored in the MID module in time, after step S703, the method further comprises the following steps.

Step S704: The FP module sends the unregistration message to the MID module, wherein the unregistration message includes the identification information of the unregistered PP machines.

Step S705: The MID module updates the locally stored registration information of the registered PP machines using the unregistration message.

Preferably, if the user needs to access a plurality of PP machines to the home information machine in one registration process, in order to improve the registration efficiency of the PP machines, in the technical solution of the disclosure, after the FP module enters the registration sate, the plurality of PP machines are registered in turn, and the registration passwords of all PP machines are identical; after the plurality of PP machines are registered, the user uses the MID module to control the FP module to exit the registration state.

Preferably, for a case in which the number of the PP machines accessed to the home information machine has reached its upper limit currently and there are still new PP machines to be registered, the user needs to use the MID module to unregister the PP machines that are not used temporarily or not used for a long time, after the unregistration is finished, new PP machines are registered according to the above registration process.

Preferably, for a case in which one home information machine comprises a plurality of MID modules, a registration password is set for each MID module, when the user needs to register a PP machine, the registration password input by the PP machine is matched with the registration passwords corresponding to the plurality of MID modules, the MID module with matched registration password is determined as the target MID module to which the PP machine is to be accessed, and the PP machine is registered to the target MID module.

Preferably, for a home information machine rightly delivered from the factory, when the home information machine is not accessed with any PP machine, in order to avoid security problem caused by the default password, when the PP machine is registered in the home information machine for the first time, the user needs to input the pairing code through the interface provided by the MID module of the home information machine to execute the registration process.

In the embodiment of the disclosure, the FP module is set on a traditional home information machine; when a new PP machine is to be registered in the home information machine, the MID module of the home information machine sends the verification information to the FP module and controls the FP module to enter the registration state; after receiving the verification information sent by the PP machine to be registered, the FP module verifies the verification information sent by the PP machine to be registered by the verification information sent by the MID module; after the verification is successful, it determines that the registration of the PP machine to be registered is successful, and exits the registration state under the control of the MID module. With the technical solution of the disclosure, when the PP machine is to be registered, the registration process can be executed only after the FP module enters the registration state under the control of the MID module; when the FP module exits the registration state, the registration of PP machines is not allowed, thereof the security and reliability of the registration process are improved; the problem in the prior art of low security and reliability of the registration process, which is caused because the registration can be executed as long as correct verification information is sent by the PP machines when PP machines are registered and illegal users can easily access illegal PP machines to the home information machine just by obtaining the verification information stored in the MID module, is overcome.

Obviously, for those skilled in the art, the disclosure may have various changes and variants within the spirit and scope of the disclosure; in this way, if these modifications and variants are made within the claims and equivalent technologies of the disclosure, these modifications and variants should be included within the protection scope of the disclosure.

What is claimed is:

1. A registration method for a home information machine, comprising:
   a Fixed Part (FP) module of the home information machine receiving a registration command and first verification information sent by a Mobile Internet Device (MID) module of the home information machine, wherein the first verification information is used to verify verification information input by a Portable Part (PP) machine to be registered;
   the FP module entering a registration state, and receiving a registration request and second verification information sent by the PP machine to be registered; and the FP module verifying the second verification information by the first verification information, determining whether the registration of the PP machine to be registered is successful according to the verification result, and exiting the registration state when determining that the registration of the PP machine to be registered is successful.

2. The method according to claim 1, further comprising:
before the FP module enters the registration state,
the FP module judging whether entering of the registration state is allowed according to a current service state of the FP module, sending a notification message indicating that the entering of the registration state is prohibited to the MID module, and ending the registration process when the entering of the registration state is not allowed.

3. The method according to claim 2, wherein the first verification information is verification information randomly generated by the MID module, or verification information self-defined by the user through an interface provided by the MID module.

4. The method according to claim 2, further comprising:
after the FP module enters the registration state,
when the FP module fails to receive the registration request sent by the PP machine to be registered within a threshold time period after entering the registration state, the FP module exiting the registration state and ending the registration process.

5. The method according to claim 2, further comprising:
after determining that the registration of the PP machine to be registered is failed, the FP module sending a verification information input command to the PP machine to be registered, and verifying a third verification information input by the PP machine to be registered by the first verification information;
when a number of times for inputting the verification information by the PP machine to be registered exceeds a set threshold number and neither of the inputs of the verification information is correct, the FP module exiting the registration state and ending the registration process.

6. The method according to claim 1, wherein the FP module determining whether the registration of the PP machine to be registered is successful specifically comprises:
the FP module comparing the first verification information with the second verification information, determining that the registration is successful when the first verification information and the second verification information are identical, and determining that the registration is not successful when the first verification information and the second verification information are not identical.

7. The method according to claim 6, wherein the first verification information is verification information randomly generated by the MID module, or verification information self-defined by the user through an interface provided by the MID module.

8. The method according to claim 6, further comprising:
after the FP module enters the registration state,
when the FP module fails to receive the registration request sent by the PP machine to be registered within a threshold time period after entering the registration state, the FP module exiting the registration state and ending the registration process.

9. The method according to claim 6, further comprising:
after determining that the registration of the PP machine to be registered is failed, the FP module sending a verification information input command to the PP machine to be registered, and verifying a third verification information input by the PP machine to be registered by the first verification information;
when a number of times for inputting the verification information by the PP machine to be registered exceeds a set threshold number and neither of the inputs of the verification information is correct, the FP module exiting the registration state and ending the registration process.

10. The method according to claim 1, further comprising:
after determining that the registration of the PP machine to be registered is successful,
the FP module sending registration information of the registered PP machine to the MID module;
the MID module updating the stored registration information of the registered PP machine using the received registration information.

11. The method according to claim 10, wherein the first verification information is verification information randomly generated by the MID module, or verification information self-defined by the user through an interface provided by the MID module.

12. The method according to claim 10, further comprising:
after the FP module enters the registration state,
when the FP module fails to receive the registration request sent by the PP machine to be registered within a threshold time period after entering the registration state, the FP module exiting the registration state and ending the registration process.

13. The method according to claim 10, further comprising:
after determining that the registration of the PP machine to be registered is failed, the FP module sending a verification information input command to the PP machine to be registered, and verifying a third verification information input by the PP machine to be registered by the first verification information;
when a number of times for inputting the verification information by the PP machine to be registered exceeds a set threshold number and neither of the inputs of the verification information is correct, the FP module exiting the registration state and ending the registration process.

14. The method according to claim 1, wherein the first verification information is verification information randomly generated by the MID module, or verification information self-defined by the user through an interface provided by the MID module.

15. The method according to claim 1, further comprising:
after the FP module enters the registration state,
when the FP module fails to receive the registration request sent by the PP machine to be registered within a threshold time period after entering the registration state, the FP module exiting the registration state and ending the registration process.

16. The method according to claim 1, further comprising:
after determining that the registration of the PP machine to be registered is failed, the FP module sending a verification information input command to the PP machine to be registered, and verifying a third verification information input by the PP machine to be registered by the first verification information;
when a number of times for inputting the verification information by the PP machine to be registered exceeds a set threshold number and neither of the inputs of the verification information is correct, the FP module exiting the registration state and ending the registration process.

17. An unregistration method for a home information machine, comprising:
- a Fixed Part (FP) module of the home information machine receiving an unregistration request sent by a Mobile Internet Device (MID) module of the home information machine or a Portable Part (PP) machine to be unregistered, wherein the unregistration request includes identification information of the PP machine to be unregistered;
- the FP module unregistering the PP machine corresponding to the identification information included in the unregistration request; and
- the FP module sending a notification message indicating that unregistration is successful to the PP machine to be unregistered, further comprising:
- after the FP module unregisters the PP machine successfully,
- the FP module sending an unregistration message to the MID module;
- the MID module updating stored registration information of the registered PP machine using the unregistration message.

18. The method according to claim 17, further comprising:
before the FP module unregisters the PP machine,
the FP module determining whether unregistration of the PP machine is allowed according to a current service state of the FP module, sending a notification message indicating that the unregistration is not allowed to the MID module or the PP machine initiating the unregistration request, and ending the unregistration process when the unregistration of the PP machine is not allowed.

19. The method according to claim 18, further comprising:
after the FP module unregisters the PP machine successfully,
the FP module sending an unregistration message to the MID module;
the MID module updating stored registration information of the registered PP machine using the unregistration message.

20. A home information machine, comprising a Mobile Internet Device (MID) module, and further comprising a Fixed Part (FP) module;
- the MID module is configured to send a registration command and first verification information to the FP module;
- the FP module is configured to enter a registration state and receive a registration request and second verification information sent by a Portable Part (PP) machine to be registered when receiving the registration command; and to verify the second verification information by the first verification information, determine whether the registration of the PP machine to be registered is successful according to the verification result, and exit the registration state when determining that the registration of the PP machine to be registered is successful.

21. The home information machine according to claim 20, wherein the FP module is further configured to judge, before entering the registration state, whether entering of the registration state is allowed according to a current service state of the home information machine, and to send a notification message indicating that the entering of the registration state is prohibited to the MID module and end the registration process when the entering of the registration state is not allowed.

22. The home information machine according to claim 21, wherein,
- the FP module is further configured to send registration information of the registered PP machine to the MID module after determining that the registration of the PP machine to be registered is successful;
- the MID module is further configured to update the stored registration information of the registered PP machine using the received registration information.

23. The home information machine according to claim 20, wherein,
- the FP module is further configured to send registration information of the registered PP machine to the MID module after determining that the registration of the PP machine to be registered is successful;
- the MID module is further configured to update the stored registration information of the registered PP machine using the received registration information.

24. A home information machine, comprising a Mobile Internet Device (MID) module, and further comprising a Fixed Part (FP) module;
- the FP module is configured to receive an unregistration request sent by the MID module of the home information machine or a Portable Part (PP) machine to be unregistered, wherein the unregistration request includes identification information of the PP machine to be unregistered; to unregister the PP machine corresponding to the identification information included in the unregistration request; and to send a notification message indicating that unregistration is successful to the PP machine to be unregistered, wherein,
- the FP module is further configured to send an unregistration message to the MID module after unregistering the PP machine successfully;
- the MID module is further configured to update stored registration information of the registered PP machine using the unregistration message.

25. The home information machine according to claim 24, wherein the FP module is further configured to determine, before unregistering the PP machine, whether unregistration of the PP machine is allowed according to a current service state of the FP module, to send a notification message indicating that the unregistration is not allowed to the MID module or the PP machine initiating the unregistration request, and to end the unregistration process when the unregistration of the PP machine is not allowed.

26. The home information machine according to claim 25, wherein,
- the FP module is further configured to send an unregistration message to the MID module after unregistering the PP machine successfully;
- the MID module is further configured to update stored registration information of the registered PP machine using the unregistration message.

* * * * *